(12) United States Patent
Nygren et al.

(10) Patent No.: US 7,607,522 B2
(45) Date of Patent: Oct. 27, 2009

(54) SHOCK ABSORBER FOR VEHICLES

(75) Inventors: Nils-Göran Nygren, Huddinge (SE); Christer Lööw, Stockholm (SE)

(73) Assignee: Öhlins Racing AB, Upplands Väsby (SE)

( * ) Notice: Subject to any disclaimer, the term of this patent is extended or adjusted under 35 U.S.C. 154(b) by 613 days.

(21) Appl. No.: 11/261,777

(22) Filed: Oct. 31, 2005

(65) Prior Publication Data

US 2006/0102440 A1    May 18, 2006

(30) Foreign Application Priority Data

Nov. 18, 2004   (SE) .................................. 0402820

(51) Int. Cl.
*F16F 9/34*    (2006.01)
(52) U.S. Cl. ................. 188/319.1; 188/314; 188/322.14
(58) Field of Classification Search ............. 188/319.1, 188/319.2, 322.2, 322.14, 314
See application file for complete search history.

(56) References Cited

U.S. PATENT DOCUMENTS

| | | | |
|---|---|---|---|
| 3,193,875 A * | 7/1965 | Taylor | ............................ 91/31 |
| 3,738,311 A | 9/1973 | Appleton | |
| 3,830,139 A * | 8/1974 | Wachsman et al. | ................ 92/9 |
| 4,280,600 A | 7/1981 | Salmon et al. | |
| 4,673,063 A | 6/1987 | Engle | |
| 4,900,056 A | 2/1990 | Fukushima et al. | |
| 5,082,309 A | 1/1992 | Schutzner et al. | |
| 5,222,759 A | 6/1993 | Wanner et al. | |
| 5,351,562 A | 10/1994 | Scott | |
| 5,469,978 A | 11/1995 | Bankos et al. | |

(Continued)

FOREIGN PATENT DOCUMENTS

BE    458209 A    3/1945

(Continued)

OTHER PUBLICATIONS

Extended European Search Report from the European Patent Office dated Oct. 16, 2006.

(Continued)

*Primary Examiner*—Christopher P Schwartz
(74) *Attorney, Agent, or Firm*—Connolly Bove Lodge & Hutz LLP

(57) ABSTRACT

A damper for vehicles is arranged with selectable or adjustable damping force characteristics that are essentially independent of other internal or external function factors in the damper. For this, fixing devices and a surrounding arrangement, piston arrangement and piston rod arrangement are utilized. In the event of a damping force arising on the arrangement's piston in a certain direction of the piston, an operating device with valves and pipes is arranged to ensure that there is an increase in pressure on the side of the piston facing towards the direction, while the pressure is essentially maintained on the side of the piston facing away from the direction. In addition, pressure-maintaining devices are included that ensure that the pressure in the arrangement is maintained in the event of the occurrence of pressure-affecting parameters. The damper is preferably arranged with adjusting devices that determine the damping force characteristics according to their setting. By means of the invention, a compact damper can be achieved, while at the same time the selected or adjusted damping force characteristics do not affect other factors in the damper.

9 Claims, 12 Drawing Sheets

U.S. PATENT DOCUMENTS

| | | |
|---|---|---|
| 5,873,437 A | 2/1999 | Danek |
| 5,984,059 A * | 11/1999 | Kurachi et al. ............. 188/318 |
| 6,112,866 A | 9/2000 | Boichot et al. |
| 6,978,872 B2 * | 12/2005 | Turner ..................... 188/282.8 |
| 2004/0020355 A1 | 2/2004 | Shih |

FOREIGN PATENT DOCUMENTS

| | | |
|---|---|---|
| EP | 0197316 A | 10/1986 |
| EP | 0322608 | 7/1989 |
| EP | 0322608 A2 | 7/1989 |
| EP | 0 593 403 A1 | 4/1994 |
| EP | 0593403 A1 | 4/1994 |
| EP | 0 601 982 A1 | 6/1994 |
| EP | 0601982 A1 | 6/1994 |
| EP | 0 621 417 A2 | 10/1994 |
| EP | 0621417 A2 | 10/1994 |
| EP | 0747277 A | 12/1996 |
| EP | 1054185 A2 | 11/2000 |
| EP | 1184251 A1 | 3/2002 |
| EP | 1 505 315 A2 | 2/2005 |
| EP | 1505315 A1 | 2/2005 |
| JP | 60151439 A | 8/1985 |

OTHER PUBLICATIONS

Partial European Search Report from the European Patent Office dated Mar. 30, 2006.

* cited by examiner

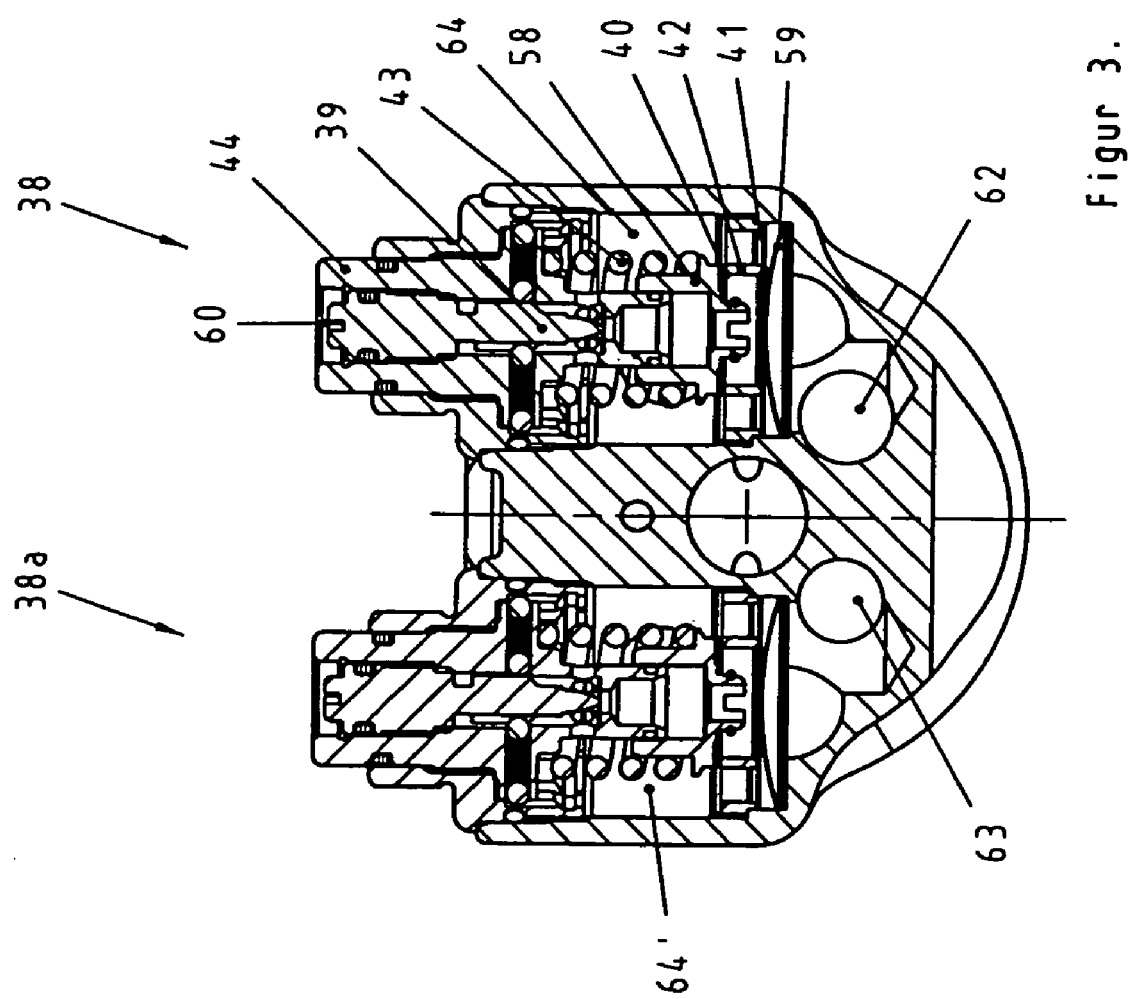

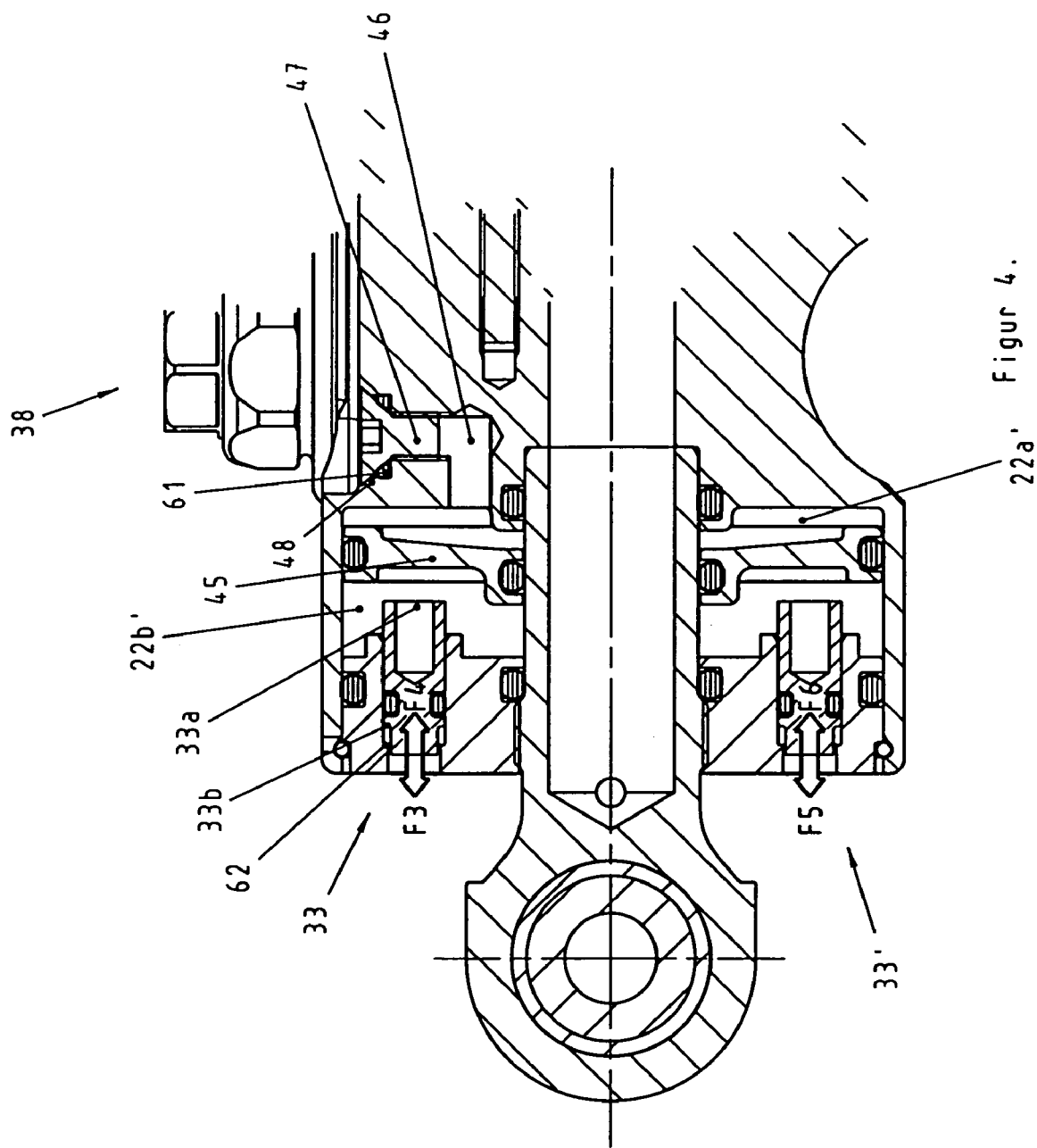

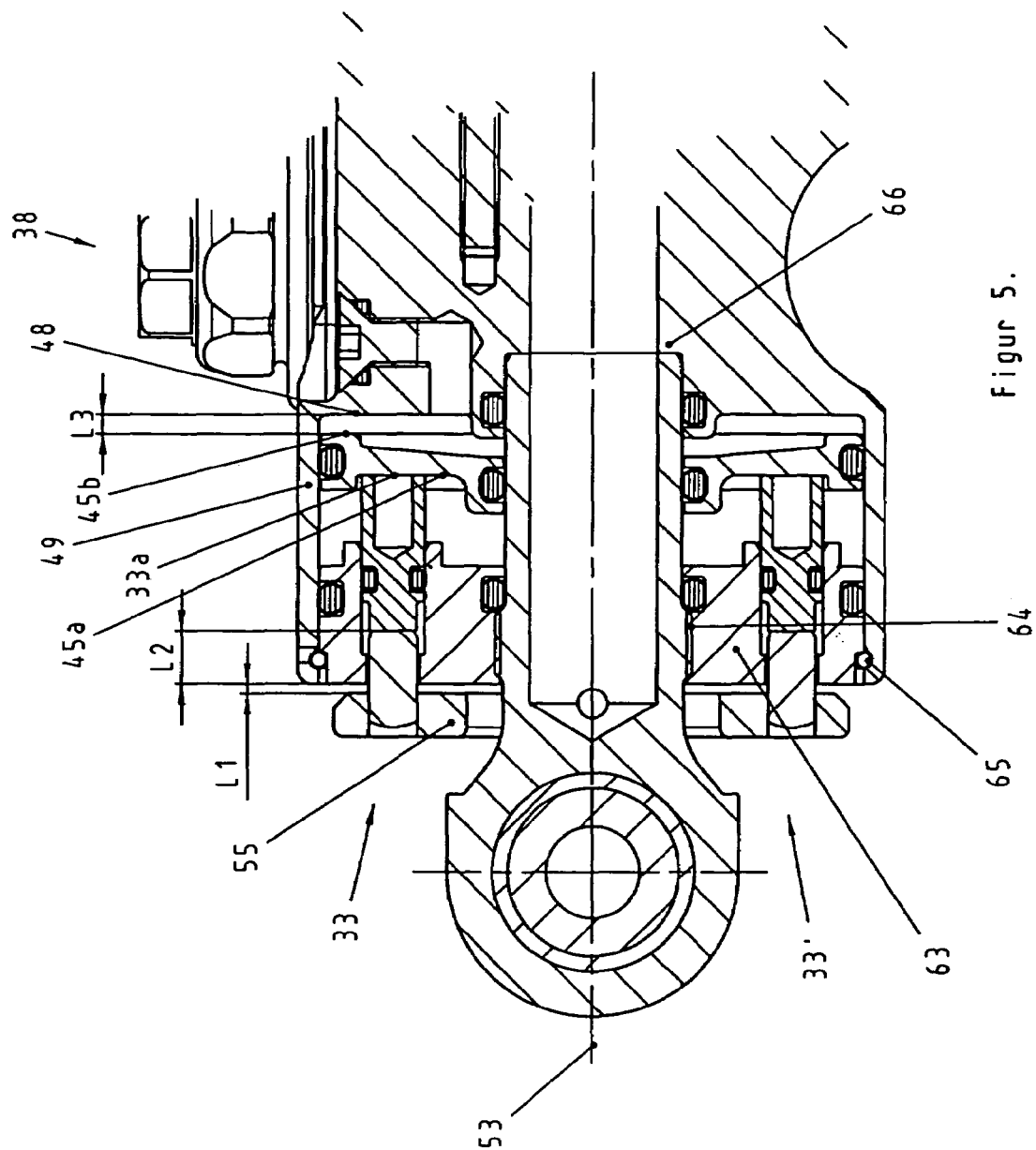

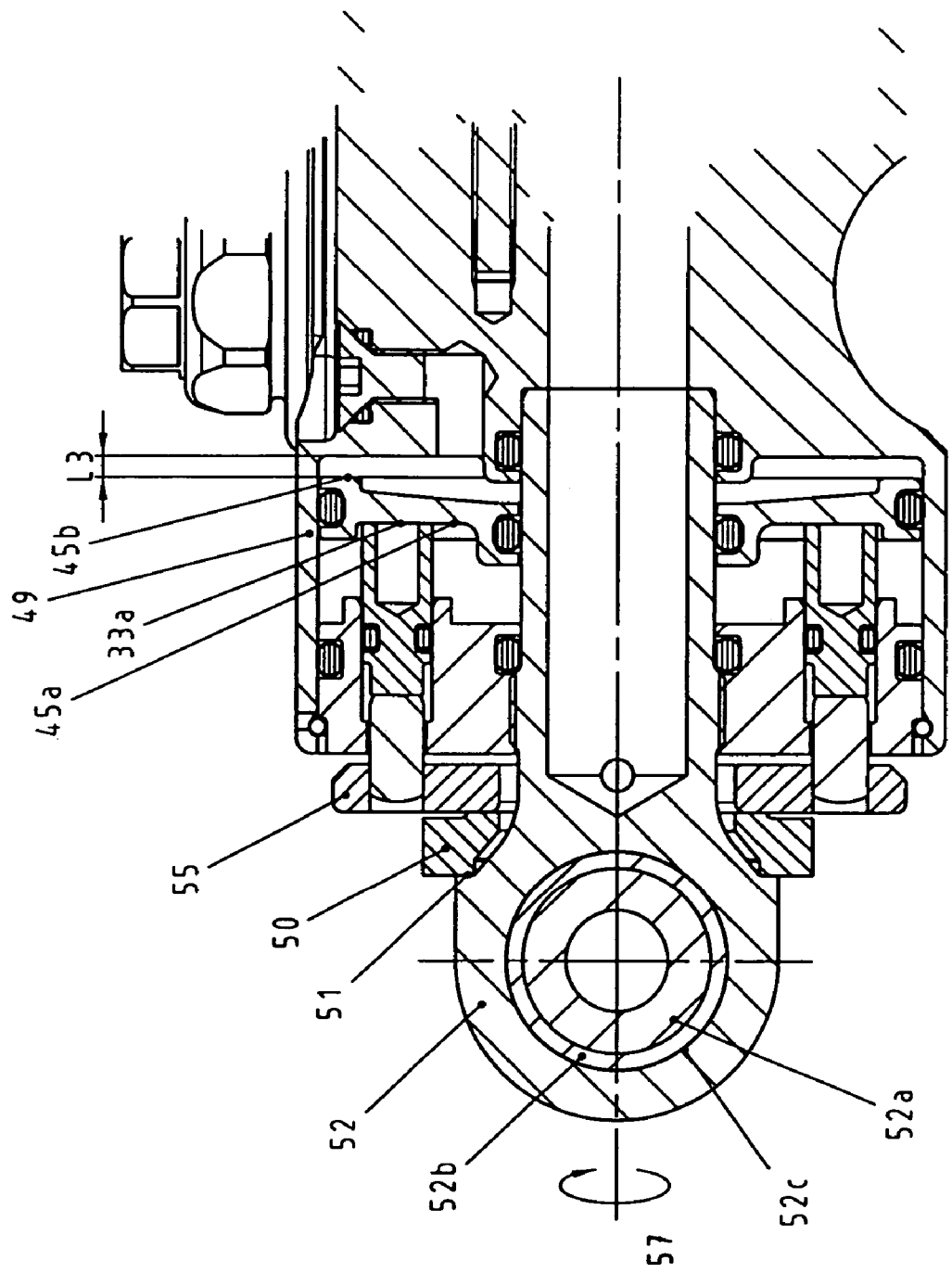

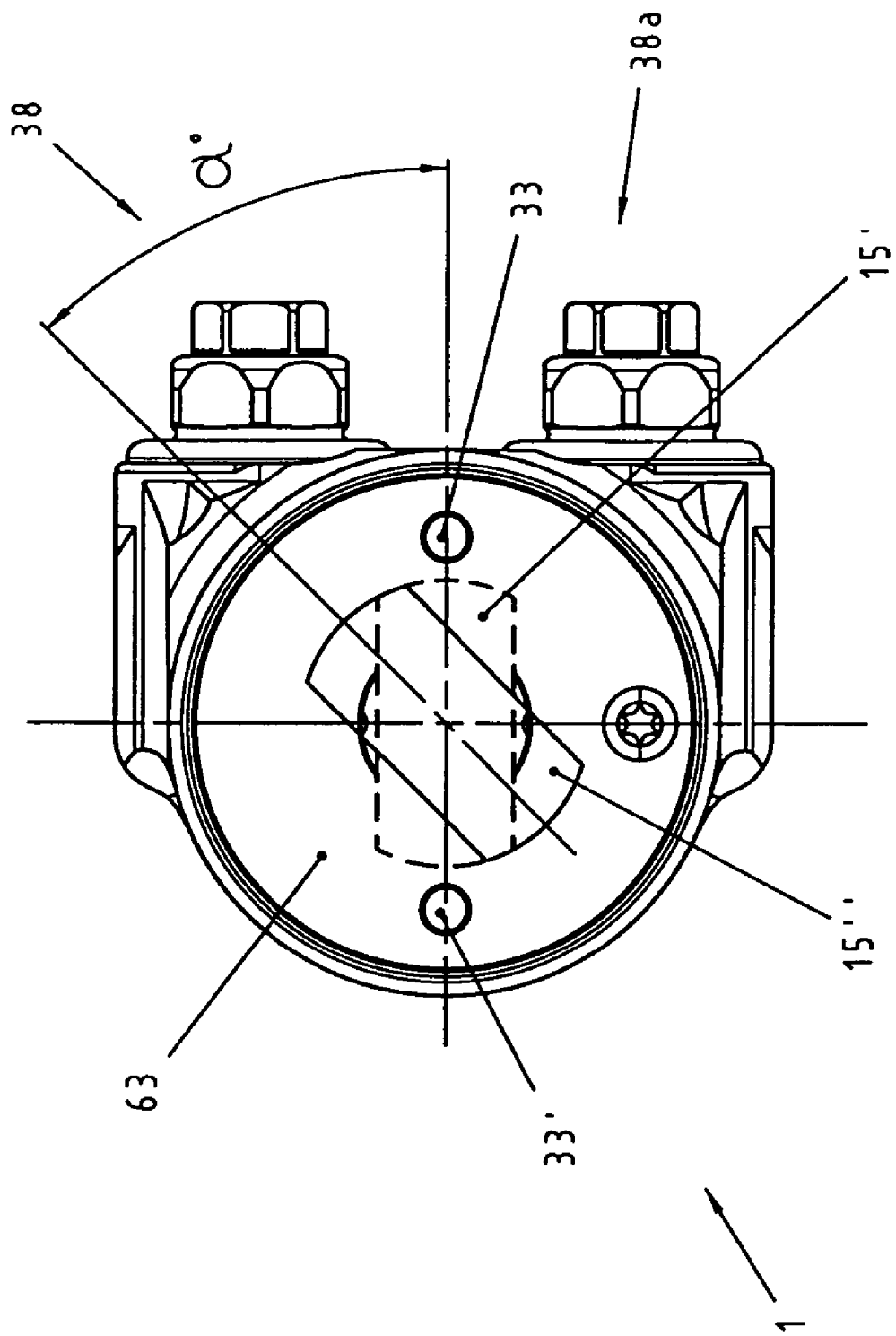
Figur 7.

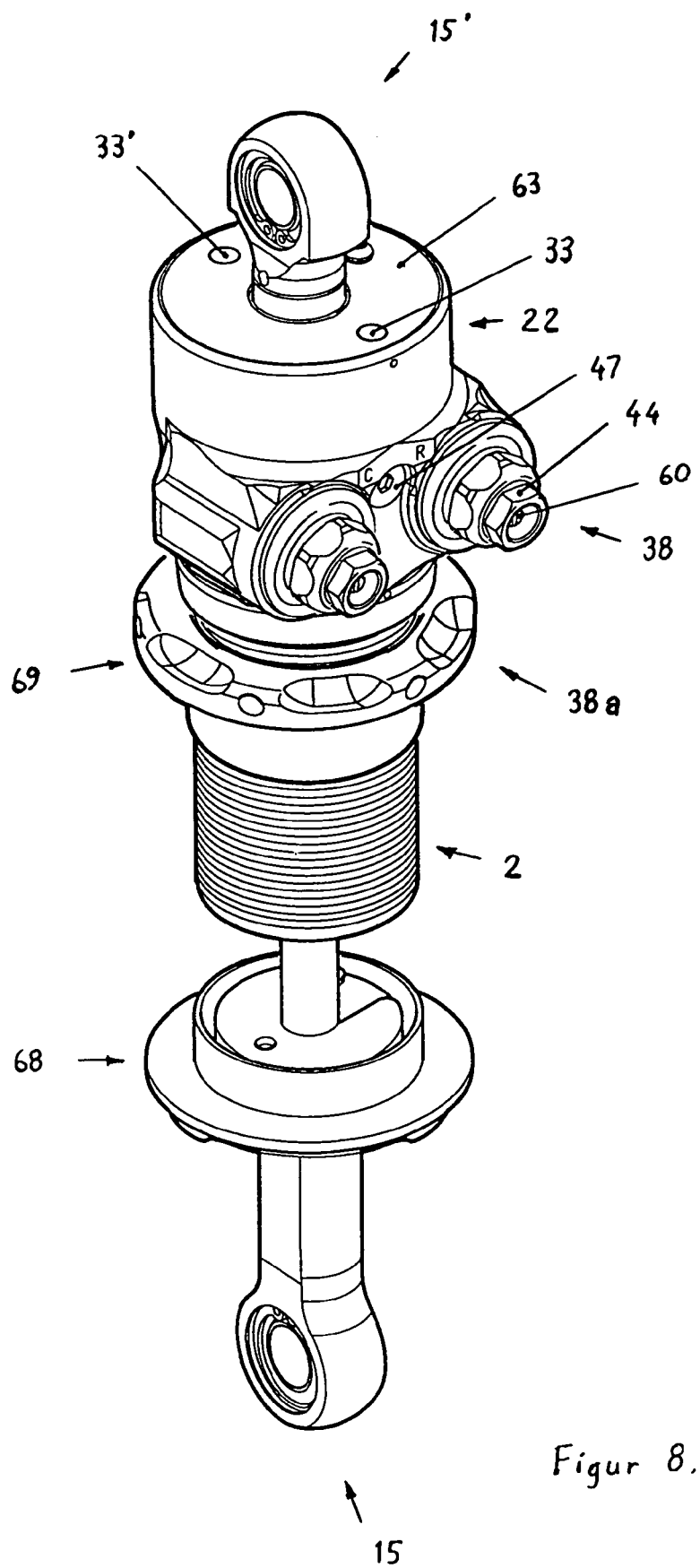
Figur 8.

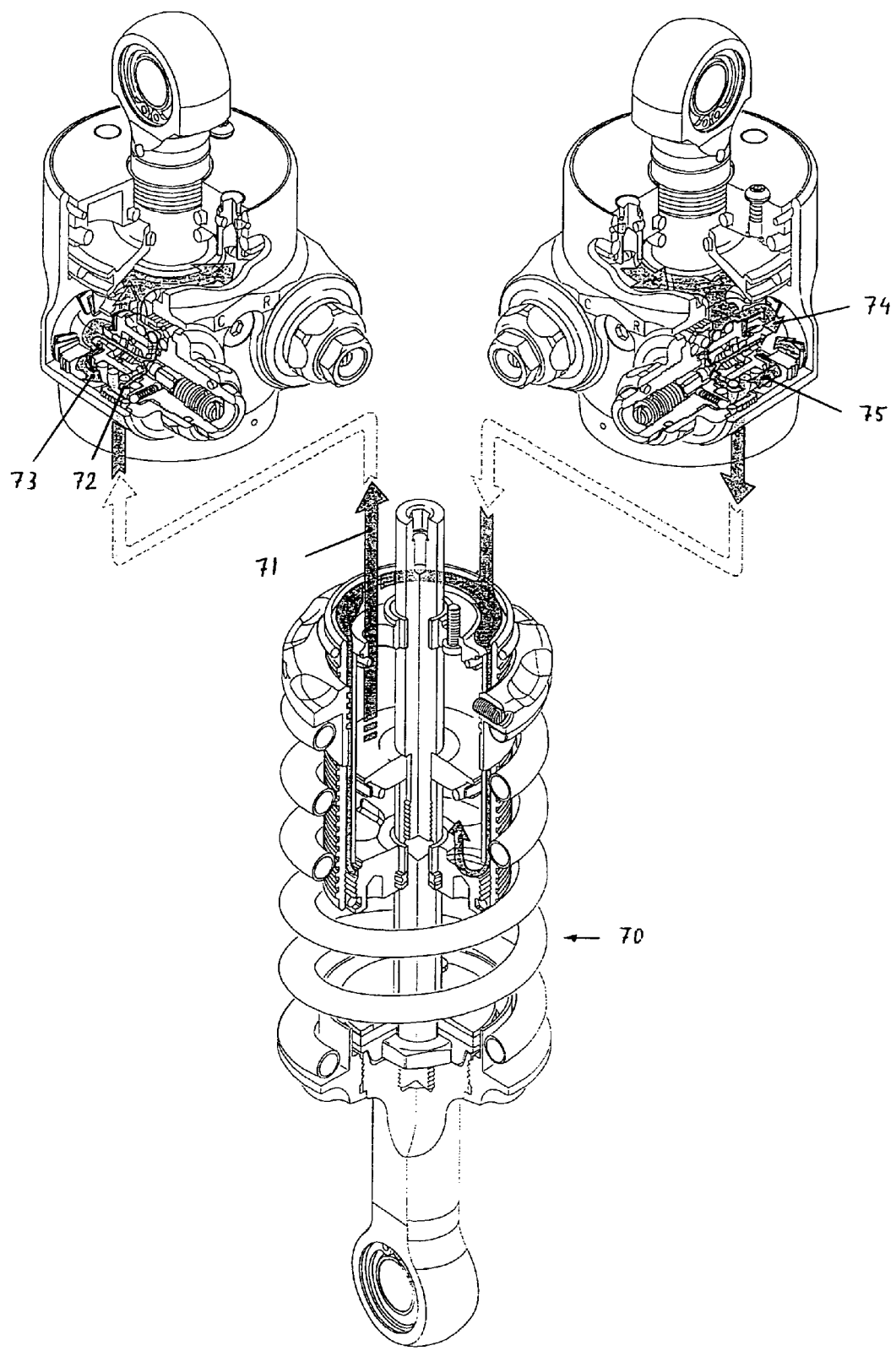
Figur 9

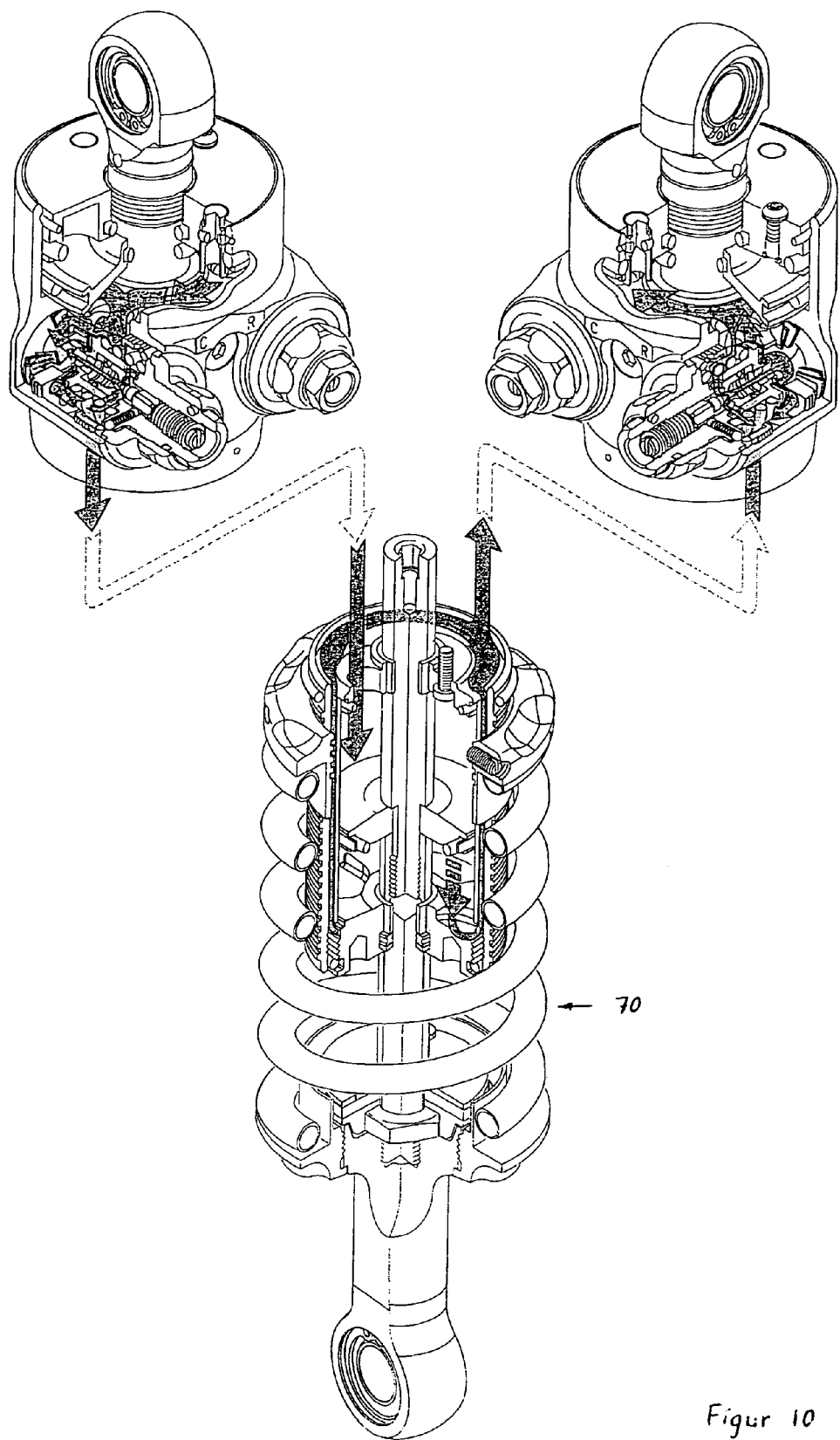
Figur 10

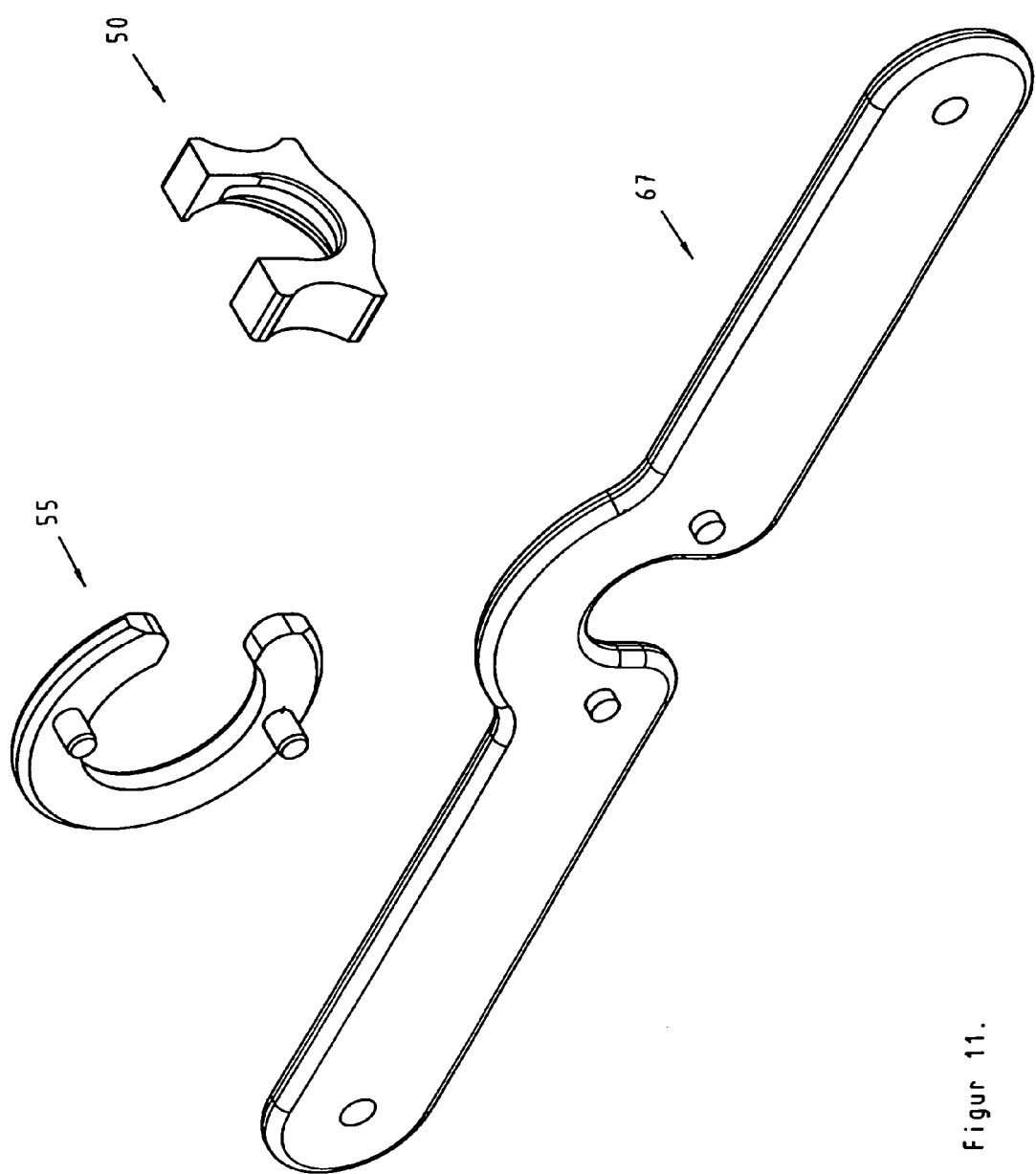
Figur 11.

SHOCK ABSORBER FOR VEHICLES

BACKGROUND

The present invention relates to a damper (shock absorber) intended for vehicles which is arranged with selectable or adjustable damping force characteristics that are essentially independent of other internal or external function factors in the damper. It relates primarily to vehicles in the form of cars, motorcycles, snow-scooters, etc, where the damper is arranged between movable parts comprised in the vehicle, for example between wheels, runners, etc, and a chassis.

Dampers of this kind are found in large numbers and reference can be made, for example, to shock absorbers that are sold by the applicant making the present patent application. Reference is also made to patents that have been obtained by the applicant and to patent applications previously submitted by the applicant within this field.

With this kind of damper, there is a desire for the damper's functional and/or handling characteristics to be able to be improved and made more clear-cut and yet still be able to have a simplified and less bulky construction. The object of the invention is, among other things, to solve all or parts of this problem.

There is also a need for the damper's damping force characteristics to be able to be made more clear-cut and for set or selected damping characteristics to be able to be selected when assembling dampers and when making adjustments, without at the same time affecting any other function or functions in the damper. Thus, for example, in an embodiment, the damping force characteristics must be able to be set without, for example cavitation arising or being increased or reduced. The damper's fixing must also be able to be made more clear-cut and compact constructions must be able to be arranged. Hysteresis and so-called "flex" must be able to be essentially minimized. Where a compressible medium is utilized to pressurize the damper, it is important that the gas volumes are kept to a minimal level. The pressurizing by means of the compressible medium or corresponding function (for example a spring function) is in order to increase the viscosity of the oil or fluid and to reduce the risk of cavitation. In addition to the ability to reduce the size of the damper as such while retaining good functionality, there is a desire to achieve effective cooling of the medium or mediums used in the damper. It is also important to ensure good and economically advantageous sealing and/or guiding functions that produce relatively small frictional forces on the piston rod or on the piston rod elements during their movements in the damper. Thus, for example, there is a desire to minimize the friction on the piston rod or the piston rod elements by using the least possible number of seals and/or bushings for guiding the piston rod in the cylinder barrel and through the end walls of the cylinder barrel or the like. Thus, for example, it must be possible to use a floating seal and to reduce the dimension tolerances of the cylinder barrel. The volume of the damper medium or mediums must be able to be kept within a certain range, in order to ensure the function of the damper. In a preferred embodiment, in a damper utilizing a separating piston, it must be possible to read off or determine the position of the separating piston. This must be able to be carried out without, for example, having to dismantle all or parts of the damper. An end eye utilized as a fixing device must, in addition, be able to be arranged in such a way that no resulting force will arise on the piston rod as a result of the internal overpressure that is caused by the compression of the medium concerned. There can also be difficulties in determining whether the damper is pressurized or not. There are also problems in being able to ensure that a separating piston that is utilized is in the correct position when the damper is filled with the medium. A relatively large amount of work has previously been required in order to ensure this and there is a desire to be able to reduce this work. It is also important to be able to prevent the damper medium leaking out as a result of a separating piston that is utilized leaving its sealed course during the filling. When a pressure indicator is utilized to check the quantity of damper medium, there is a need for simple pressure indication functions that are easy to use but that are still clear-cut in their function. Among other things, it is important that the connection hole or holes for the pressure indictors can be made relatively small. There is also a desire for the seal(s)/bushing(s) to be located as close to the main piston as possible, in order to minimize the length of the piston rod arrangement and thereby minimize the total length of the damper, without increasing the cost of production. Where a top eye is utilized, it must be able to be mounted at any angle to the body of the damper in a simple way, without the locking of the top eye encroaching upon the length of the damper The object of the invention is also to solve all or parts of these additional problems.

SUMMARY OF INVENTION

The principal characteristics of a damper according to the invention are based on a unique combination of elements that can be combined, which elements may perhaps be completely or partially previously known individually. Thus, for example, the invention is characterized in that it comprises an operating device or devices with valves and pipes with a surrounding arrangement, piston arrangement and piston rod arrangement, provided with fixing devices that make possible connection to parts of the vehicle that move relative to each other. In the event of a damping force arising on the arrangement's piston in a certain direction of the piston, this device or these devices are arranged to ensure that there is an increase in pressure on the side of the piston facing towards the direction, while the pressure is essentially maintained on the side of the piston facing away from the direction. This function is called a positive pressure build-up function, in association with the present invention. The invention is also characterized in that the said operating device or devices are arranged to bring about the independent damping force characteristics mentioned in the introduction. In addition, pressure-maintaining devices are arranged to ensure that the pressure in the arrangement is maintained in the event of the occurrence of pressure-affecting parameters that try to change the pressure. Examples of such parameters are changes in temperature, changes in volume, changes in the piston rod displacement, etc. Finally, the damper is preferably arranged with adjusting devices that determine the damping force characteristics according to their setting. Detecting devices are preferably also utilized, for example in the form of the said pressure indictors.

In a preferred embodiment, the damper is provided with a piston rod arrangement that goes through the piston (the main piston) or extends from both sides of the piston with one or more piston rod elements extending from each side. By this means, the piston rod displacement on one side of the piston can be counteracted by the change or changes in volume caused by the piston rod displacement(s) on the other side of the piston. In an additional embodiment, the operating device with valves and pipes comprises a volume connected to the internal volume or barrel of the surrounding arrangement or of the cylinder arrangement via valves, for example non-return valves, which volume forms a low-pressure zone which is, in turn, connected to the pressure-maintaining device that thereby can comprise a pressure-generated piston arranged to be able to be operated by the effect of a resistance device or a compressible gas that is arranged in an accumulator or gas container. Alternatively or in addition, the resistance device can consist of a spring arrangement or a device working in a corresponding way. By means of the connection via the said valves, that, for example, can comprise one or more non-return valves, the volume or low-pressure zone in question ensures the positive pressure build-up in association with the movements of the piston in the said barrel. In the said preferred embodiments, the damper can consist of what is called a twin-tube damper, that is a damper with double tubes and, with such a damper, the damper medium concerned is arranged to be able to be fed in the space between the inner and outer tube of the twin-tube damper from one side of the piston to the other side via the said valves. The pressure-maintaining device preferably comprises a gas-separating piston. A first fixing device can comprise, for example, an end eye. The end eye is attached to or constitutes part of the piston rod arrangement. A second fixing device can comprise a fixing eye or top eye. Alternatively or in addition, the damper can be attached to one of the vehicle's movable parts via another part of the damper's body or outer part. The damper can be constructed as a common unit where the surrounding arrangement or the cylinder arrangement is connected to a damper head and extends from this to the first end of the unit. The pressure-maintaining device can be arranged in association with the damper head or with the other side of the damper head. The indicators and adjusting devices for volumes and damping characteristics can be arranged in association with the said damper head that can consist of a part of the damper. The guiding of the piston or piston rod element can be carried out by means of bushings placed on each side of the cylinder barrel in such a way that, for example, a first bushing is arranged at an end wall or support element placed outside the cylinder barrel and a bushing is mounted in the said damper head or in a component or components mounted on this. The piston rod or piston rod elements are arranged in association with the cylinder barrel and pass through the end walls. The low pressure zone is arranged in association with the damper head and is arranged as a component with a central hole or in a component with a central hole, through which the piston rod part or the piston rod elements concerned operate. Sealing can be carried out by means of seals that form a seal against the top eye that has a tube-shaped part, through the hole in which the piston rod or the piston rod elements concerned can pass. By utilizing the volume in association with the separating piston for transference of the damper medium between both sides of a piston (main piston), the parts that delimit the gas container contribute to efficient cooling, as large quantities of damper medium can pass through.

Additional further developments of the concept of the invention are apparent from the following subsidiary claims.

A currently preferred embodiment of a damper that has the significant characteristics of the invention will be described below with reference to the attached drawings in which:

BRIEF DESCRIPTION OF DRAWINGS

FIG. 3 shows the damper according to FIG. 2, in cross-section and enlarged in relation to FIG. 2, FIGS. 4-6 show the damper's components for the damper head, in longitudinal section and enlarged, and FIGS. 7-11 show the detailed construction of the damper in a perspective view, an end view and an exploded diagram.

DETAILED DESCRIPTION

Figure 1:
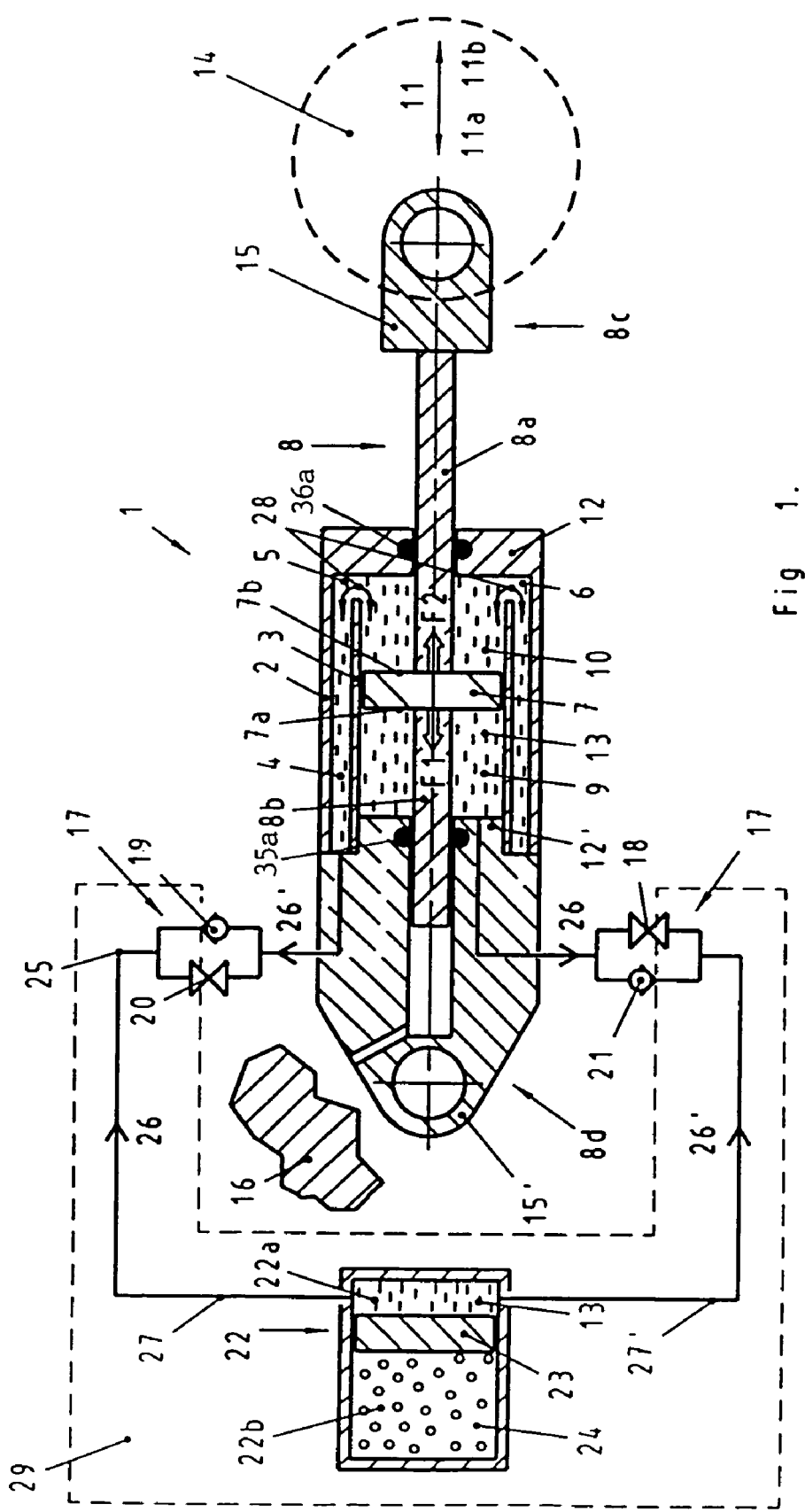
FIGS. 1 and 1A shows different dampers and components connected to this or comprised in this, in outline.

In FIG. 1, parts of a damper are indicated in outline by 1. In the embodiment, the damper consists of a twin-tube damper, with an outer tube indicated by 2 and an inner tube indicated by 3. The tubes are arranged with a space 4 in between and have, at the first end of the damper, passages 5, 6 for a medium arranged in the damper. The damper can be of the type that comprises a main piston 7 and a piston rod 8 extending through the main piston 7, with the piston rod parts on one side of the piston being indicated by 8a and the piston rod part on the other side of the piston being indicated by 8b. The damper's compression volume or compression side is indicated by 9 and the expansion volume or expansion side is indicated by 10. The piston and the piston rod are arranged in the cylinder barrel 9, 10 in such a way that they can move in the directions of the arrows 11. The piston 7 operates in a medium 13 that preferably consists of hydraulic oil that can comprise associated additives in a known way. Alternatively, glycol and/or water can be utilized as the fluid. The piston rod 8a and 8b can extend from the upper and lower sides 7a and 7b of the piston respectively. The piston rod can, in principal, comprise piston rod element parts that can be more than one in number. Thus, the piston rod part 8a and/or 8b can consist of more than one piston rod part or piston rod element. Thus, for example, the piston rod part 8a can consist of one piston rod part, while the piston rod part 8b can be replaced by two or more piston rod elements. The end wall parts of the damper are indicated by 12 and 12'. The piston rod end 8c on the piston rod part 8a has a fixing device 15 (for example, an end eye) to a part of a vehicle concerned, which part can consist of a wheel suspension component (hub, shaft, etc) 14. On the damper end 8d, the damper has a fixing device 15' (for example, a top eye) that can be attached to a part 16 of the chassis of a vehicle concerned. The damper is arranged with a valve arrangement that is indicated in outline by 17. In the present application, the valve arrangement is called an operating device. The said device comprises a first damping force generating valve or compression damping valve 18 and a first non-return valve 19. In addition, there is a second damping force generating valve or return damping valve 20 and a second non-return valve 21. These damping force generating valves can consist of one or more valves connected in parallel and/or in series. In accordance with FIG. 1, there is also an accumulator or gas container 22 that comprises a separating piston 23. In a first volume 22a, the gas container holds a medium 13, for example the said hydraulic oil with any additives or other fluid (see above). The gas container also has a second volume 22b that holds a second medium 24 that is more compressible than the medium 13. The medium 24 can consist of gas, for example air, nitrogen or other gas with additives. The said operating device 17 also comprises pipes that interconnect the said valves 18, 19, 20 and 21 and the volume 22a in the container 22 and that interconnect the said space 4 and the volumes 9 and 10 in the damper. In this embodiment, the space 4 and the volume 10 can be regarded as a common volume. The said valves 18 and 19 are thus comprised in a first loop comprising the volume 19, the pipe 27', the volume 22a and the pipe 27, and in which the space 4 and the passage(s) 5 and 6 are also connected, and similarly the volume 10. A second loop consists of the valves 20 and 21 with otherwise the same pipes. The direction of flow in association with compression of the shock absorber, often called the compression phase, is indicated by the arrows 26, while the direction of flow in association with expansion of the shock absorber, often called the return phase, is indicated by the arrows 26'. It is also fully possible, in an embodiment, to incorporate valves in the main piston 7 that are used in combination with other valves. The first damping force generating valve 18 is connected at one end to the volume 9 in the damper, while the first non-return valve 19 is connected to the space 4. The second damping force generating valve 20 is connected to the space 4, while the second non-return valve is connected to the volume 9. The said first valves 18 and 19 are also connected to the second valves 20 and 21 via the pipes 27', 22a and 27. In association with the compression movement in the damper, that is when the piston 7 moves to the left in FIG. 1, the medium 13 is forced via the valve 18 and the intermediate pipe and non-return valve 19 into the space 4. The space 4 thus carries the medium, that was fed from the volume 9, to the volume 10. Depending upon the design of the valve 20, more or less medium can also be fed from the volume 9, via the valve 18, the pipe 27', the volume 22a, the pipe 27 and backwards through the valve 20 (that is against the indicated direction of the arrow 26') and the space 4 to the volume 10, cf. so-called bleed function. In a corresponding way, in association with an expansion movement, that is movement of the piston to the right in FIG. 1, the medium is fed from the volume 10 to the volume 9 via intermediate pipes, the space 4, the valve 20, the volume 22a and the valve 21. Also here, it is the case that more or less medium can be fed to the volume 9, via the pipes 27, 27' and backwards through the valve 18 (against the indicated direction of the arrow 26), cf. bleed function. In the present application, this transferring function between the volumes 9 and 10 is called positive pressure build-up, which is characterized in that the pressure of the medium that is at the side facing away from the piston's direction of movement is essentially prevented from dropping below the pressure of the medium before the movement in question of the piston. When the piston moves to the left in FIG. 1, the medium in the volume 10 will thus essentially maintain its pressure value in spite of the movement. In a corresponding way, the medium in the volume 9 maintains its pressure value when the piston moves to the right, due to the said transferring of medium. If, for example, the piston moves in the direction of the arrow 11a, then the pressure increase on the side 7a of the piston that is facing in that direction will be increased by the valve function 18 while, at the same time, cavitation effects are avoided on the side 7b facing away from the direction of movement 11a. Corresponding increases apply for movements in the direction of the arrow 11b. The direction of movement of the medium in the space 4 and the passages 5 and 6 in the damper has been indicated by 28. FIG. 1 also shows a low pressure zone 29 for the enclosed medium, which can consist of, for example, hydraulic oil, nitrogen, etc. The said gas container with gas-separating piston 23 ensures that there is a suitable pressure, that is a suitable medium pressure, in the damper 1 in the event of changes in volume. Thus, suitable pressure levels are ensured in the event of changes in the sealed volume due to, for example, changes in temperature in the medium volume, changes in the piston rod displacement, etc. The pressurizing means that the absolute pressure level is maintained at a suitable level, for example at a level of approximately 2 bar or higher, in order to minimize the risk of cavitation due to restrictions that are in the ducts concerned. The maintaining of the gas pressure in the medium volume that is facing away from the direction of movement is, to a certain extent, determined by the drop in pressure that is caused by the valves and the pipes or ducts. The medium pressure at the side facing away from the direction of movement must, however, be essentially maintained on a level with the value that applies for a stationary piston. FIG. 1 shows forces transferred to the piston rod indicated by F1 and F2. The valves 18 and 20 have only been shown symbolically. In addition to the actual valve function, there are also surrounding arrangements arranged in a known way, for example arrangements that comprise springs, cones, fixed restrictions, shims, etc, see below. The inner tube in the twin-tube damper is shorter than the outer tube and comprises one or more open passages between the space 4 and the volume 10. The reference numeral 25 is intended to symbolize the pipe system or said operating device in its entirety.

Figure 2:
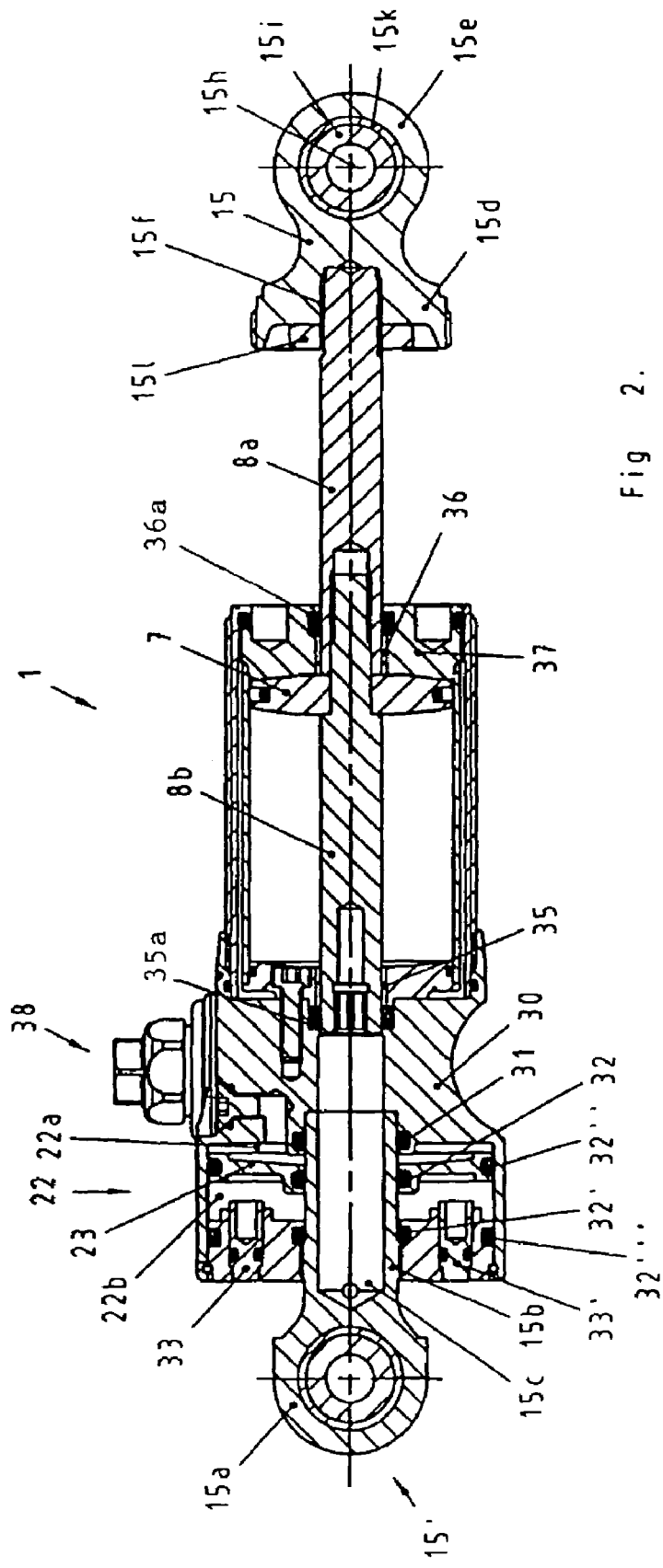
FIG. 2 shows parts of a constructive embodiment of the damper, in longitudinal section.

FIG. 2 shows a constructive embodiment of the damper 1 that has a form that is called a twin-tube damper. The damper comprises a damper head 30 (here named a part). The inner and outer tube forming the twin-tube damper are arranged on one side of the damper head. The gas pressure container 22 mentioned above is arranged on or in the damper head, on its other side. The container 22 has the form of a ring-shaped component that is sealed against the fixing device 15' by means of seals 32 and 32' and against the damper head by means of seals 32" and 32'''. In addition, there is a seal 31 that prevents leakage of the damper medium into the inside of the fixing device. The said fixing device has a fixing part 15a and a cylindrical part 15b, on the outside of which the said seals 31, 32 and 32' are arranged. The said piston rod part 8b is arranged to be able to move inside the opening 15c in the cylindrical part when the piston moves. Pressure-indicating devices are shown by 33 and 33'. The position of the floating piston 23 (see FIG. 1) can be determined by means of these indicating devices. In this case, the piston is mounted on a common piston rod 8a, 8b that can comprise parts that can be assembled. The piston rod arrangement is mounted with first and second bushings 35 and 36, with the first bushing being arranged in association with the damper head 30 and the second bushing 36 being arranged in the end wall 37 of the damper. Adjusting devices for setting the damper characteristics in the damper are indicated by 38 and 38a (see FIG. 3). In general, the various components in the dampers are sealed with sealing devices in a known way. Only two seals 35a and 36a seals the piston rod.

In accordance with FIG. 3, the damper can comprise two adjusting devices, which, in general, are designated 38 and 38a. The adjusting devices can be constructed in an identical way and have the same way of working. Each adjusting device comprises a bleed valve 39, a mushroom valve 58, a shim valve 40 and a non-return valve 41 with wave springs 59 that create a tension force (that is preferably close to zero). The compression bleed valve is arranged parallel to the compression mushroom valve and the expansion bleed valve is arranged parallel to the expansion mushroom valve. The position of the bleed valves can be changed from outside using a tool, for example a screwdriver, via an interacting means, that can, for example, consist of a screwdriver slot 60. The mushroom valves are urged towards their respective seatings 42 by means of preloaded springs 43. The preloading of the springs can be adjusted from the outside by means of an adjusting screw 44 that can be operated using a suitable tool, for example a box spanner or Allen key. The size of the preloading affects the opening pressure and hence the pressure differential across the main piston. The shim valves 40 are arranged in front of the mushroom valves. The shapes of the mushrooms and of the shim pack or shim stack affect the damping characteristics. The shim configuration can be varied. The construction of the damper with placing of valves, non-return valves, gas containers, ducts, etc, enables the compression and expansion valves to work independently of each other. In one embodiment, a rigid shim stack can be utilized in combination with a small preloading of the mushroom valve. The amount of oil or fluid that is fed through the bleed valves and the shim stack can be very limited before the mushroom valve opens. The opening pressure of the mushroom valve depends upon the design of the mushroom valve and the valve seating and upon the preloading of the spring. By changing these parameters, among others, the character of the damping curve can be changed or selected. The reference numeral 62 indicates a duct that leads to the space 4, while the reference numeral 63 indicates a duct that leads to the volume 9. The ducts to the volume 22a start from the volumes 64, 64', which, however, are not shown in FIG. 2. The said inner tube can be arranged to ensure the maximal rigidity in the damper construction. The damper utilizes bushings that are statically arranged in order to a long minimal distance between the bushings, (in this case a constant distance), compare the case where the bushings are placed on the piston, in order to minimize the friction and to achieve maximal rigidity in the damper in the event of the introduction of a bending moment and lateral loads. In a preferred embodiment, the piston is arranged without bushings. As an alternative in such a case, a piston seal that complies with non-concentricity is utilized. Two identical seals of, for example, the x-ring type can be used, one of which is used for the part of the piston rod that extends outwards externally and the other for the displacement piston rod. Due to the low gas pressure, the friction from the seals can be kept to a low level. The gas container can be arranged with the same diameter as the valves, whereby the oil volume 22a between the gas-separating piston and the cylinder head can be used to transfer the oil between the two valves.

The damper is arranged with the said pressure indicators 33, 33' in accordance with FIGS. 4, 5 and 6. The indicators work with a number of functions. Among other things, the indicators indicate whether the damper is pressurized or not. In a damper of this kind, there is no force from the internal pressurization on the piston rod that leads out of the damper body. Therefore it is difficult to determine whether the damper is pressurized or not. By operating one or both pressure indicators, a response to any pressurizing can easily be obtained. When an indicator is depressed, the respective indicator will be expelled by any internal pressure. If there is no pressure, the indicator or indicators will remain in their depressed position. FIG. 4 shows the pressure indicators in partially depressed positions. The holes or the openings through which the pressure indicators can be viewed are used to tighten or loosen the top eye. The indicators can also be used to position the movable piston when the damper is filled with oil or emptied. The instrument in question is used on the top eye in order to position the piston in question. In FIG. 4, depressing and expelling forces are indicated by F3, F4, F5 and F6. In this case, the separating piston is indicated by 45 and the gas volume in the gas container is indicated by 22b'. The volume of fluid in the container is indicated by 22a'. Each indicator 33, 33' is the shape of a pin, the inner end 33a of which can be acted upon by the pressure in the volume 22b'. The shoulder 33b on the pressure indicator bottoms against the shoulder 62 in the end wall of the container if there is an internal overpressure and no external force applied by means of a tool (see for example FIG. 5) or the like. The pressure indicator pin can also be depressed to make contact with the piston 45, whereby it is possible to obtain information in a simple way about the position of the separating piston, for example a setting position. Irrespective of the setting of the adjusting devices 38 and 38a, the pressure in the volume 22a' can be maintained essentially constant. The reference numeral 46 shows a duct suitable for filling with oil that is sealed by a screw 47 in combination with an O-ring 61. The screw bottoms against a seat 48.

FIG. 5 is intended to show the case when the pin 33a makes contact with the upper surface 45a of the piston 45. By depressing the respective pressure indicator 33, 33' using the tool 55, the depression distances L1 and L2 can easily be established for the pressure indicator parts 33a and a space L3 can be determined indicating the position of the piston 45 in relation to an inner surface 48 in the damper head 49 that faces its underside 45b. By this means, it can easily be checked that the position of the separating piston 45 and thereby the level of the damping medium are within a predetermined approved operating area. By the utilization of two pressure indicators, it is ensured that acting upon the piston by means of the pressure indicators can be carried out without significant uneven loading of the piston. The top eye can be locked in any rotational direction along the longitudinal axis 53 by the end wall 63 of the container being screwed outward towards the locking 65 via the thread 64 and fixing the top eye in the required rotational position. The tool 55 or the like can be utilized for this fixing function. In the said setting of the angle of rotation, the top eye is rotated around the said longitudinal axis. The setting of the angle of rotation can be carried out without a risk of leakage arising from the damper. At the same time, the top eye is given an angular position in which it is optimized for connection to the relevant moving part in or on the vehicle. By means of this setting of the angle of rotation, it is possible to adjust in which direction the adjusting device points. This is to make the adjustment on the vehicle easier. When the top eye has been set in the rotational angle, it is locked to the body of the damper head with a screw connection 64. The said geometrical stop constitutes a locking ring 65 and a locking shoulder 66. The said pressure indicators can also be arranged in such a way that it is possible to check whether the damper medium and gas medium are within predetermined pressure ranges.

The piston rod or piston rod elements are arranged to pass through and are sealed against two end walls or one end wall and one side wall. The piston rod or piston rod elements are arranged with essentially equal cross-sectional areas on both sides of the main piston.

FIG. 6 shows the application of a tool 50 that can interact with the tool 55 and the shoulders 51 on the top eye 52. By mounting these tools, the separating piston 45 is prevented from being displaced to the left in FIG. 6 when the damper is filled with oil or the like under pressure. The filling with oil can be carried out via a duct 46, see FIG. 4.

FIG. 4 also shows how force is required to press in the pressure indicators against the force from an internal overpressure of or in the gas container. This thus provides an indication of whether the damper is pressurized and makes it possible to estimate the internal overpressure. FIG. 5 shows how the oil level in the damper can be checked by means of a tool. If the distance L3 is to be checked, this is carried out by measuring the distance L2 or, in the case illustrated, more preferably the distance L1. In the latter case, the distance L1 in an embodiment must be within the range 1+0.5/−1. This means that the distance is easy to check and to determine. If the measuring tool lies in contact with the end wall of the container, the container should be filled with oil. FIG. 6 shows how positioning of the separating piston can be carried out, for example when filling the damper with oil under pressure.

The cylindrical part of the top eye 15' extends essentially into an opening arranged in the damper head. In this embodiment, the cylindrical part has a length that is essentially half the length of the total length of the top eye. The opening 15c extends along most parts of the cylindrical part which, at the part of the top eye that projects outside the damper head, has a part that is widened in the plane of the figure, which part carries the said stop surfaces for the tool 50 that can be applied. The stop surfaces 51 extend radially outside the cylindrical part 15b. The centre parts of the cylindrical part are opposite the volume 22. The said seals for the cylindrical part are arranged on both sides of the volume 22. The said stop surfaces 51 (FIG. 6) on the part 15a are essentially disc-shaped and have a thickness that is essentially the same size as the outer diameter of the tube-shaped part in the direction perpendicular to the plane of the figure in, for example, FIG. 6. The rotating part is symmetrically arranged around a central axis. The part 52 is provided with an opening 52c that extends perpendicular to the plane of the figure, with a spherically-shaped unit 52a and a device 52c with a cylindrical outside and a spherical inside arranged in the opening. A fixing device (not shown), for example a fixing screw, can extend through an opening in the said unit 52a and can be attached in the moving part on both sides of the part 52. The latter part is essentially in the form of a semicircle in the plane of the figure. The directions of rotation of the top eye around its longitudinal axis are shown by arrows 57. The end eye 15 has a corresponding construction, with a cylindrical part 15d and plate-shaped part 15e. The piston rod 8a extends into an opening 15f in which a locking nut 151 is arranged. An opening 15h, extending perpendicular to the plane of the figure in FIG. 2, a sphere 15i and an associated outer ring 15k are arranged to receive an elongated fixing device (not shown) that extends essentially perpendicular to the plane of the figure. The end eye can also assume different rotational positions around the longitudinal axis of the damper and the dimensions and design of the end eye can be selected to be similar to the top eye. By means of what is proposed, the position of the gas-separating piston can be determined in a simple way by means of one or more of the pressure indicators described above. By means of a volume 22a for the medium in the accumulator or container with the gas-separating piston being comprised in a pipe run for movement of the medium between the upper and lower sides 7a, 7b of the piston, that is the main piston 7, cf. the above, no additional duct or ducts need to be arranged to set up the transference of the medium. This means, in turn, that it is possible to reduce the volume of the damper as such and/or means that it is possible to reduce the manufacturing costs. As the piston rod arrangement is sealed in the damper arrangement by means of only two seals or sealing elements, the arrangement can operate with an optimally small friction. To date, at least three seals have been required.

FIG. 7 shows the damper 1 in an end view from the top eye side, with two rotational angle positions being indicated by solid and broken lines 15' and 15". In this case, the top eye has been rotated through an angle α that is approximately 40°. In addition, the positions of the pressure indicators 33, 33' have been shown in the figure in relation to the top eye and the adjusting devices 38, 38a. Otherwise, refer to the figures described above.

FIG. 8 shows the damper in perspective, viewed obliquely from in front. The reference numeral 63 indicates a container end wall with the pressure indicators 33, 33' and with the top eye 15' extending from the end wall. Similarly, the positions of the adjusting devices are shown, and the setting device (for example a screw) 60 arranged in the adjusting device 38 is shown. The position of the extent of the container or the accumulator 22 is also shown. The main spring platform and spring support have been shown by 68 and 69. The figure also shows the design and extent of the tube 2, and also the end eye 15 and the setting screw 47.

FIGS. 9 and 10 show the damper in perspective and in exploded view. FIG. 9 shows the movement of the medium in association with the damper's compression movement and FIG. 10 shows the movement of the medium in association with the damper's expansion movement. The damper's main spring is indicated by 70. Concerning the flow of oil or medium shown in the figures, reference is also made to FIGS. 1 and 2. FIG. 9 shows that the flow of oil 71 is taken to the right in the figure via the arrangement described above with nose seats and valve seats. Thus the bleed and high-speed flows 72 and 73 are achieved. A subsidiary return flow is indicated by 74 and the main return flow is indicated by 75. The flows 72 and 73 are related to the valve 18 and the flow 74 is related to the valve 19, according to what is described above. FIG. 10 operates in a corresponding way with reversed directions of flow and the relevant alternative valves activated. FIG. 11 shows in perspective the setting parts 50 and 55 and a tool, used or able to be used with the damper, designed for rotating the end wall of the container, cf. 63 in FIG. 8. The pins concerned protrude a short distance for fixing. The invention is not limited to the embodiments shown above as examples.

Figure 1A:
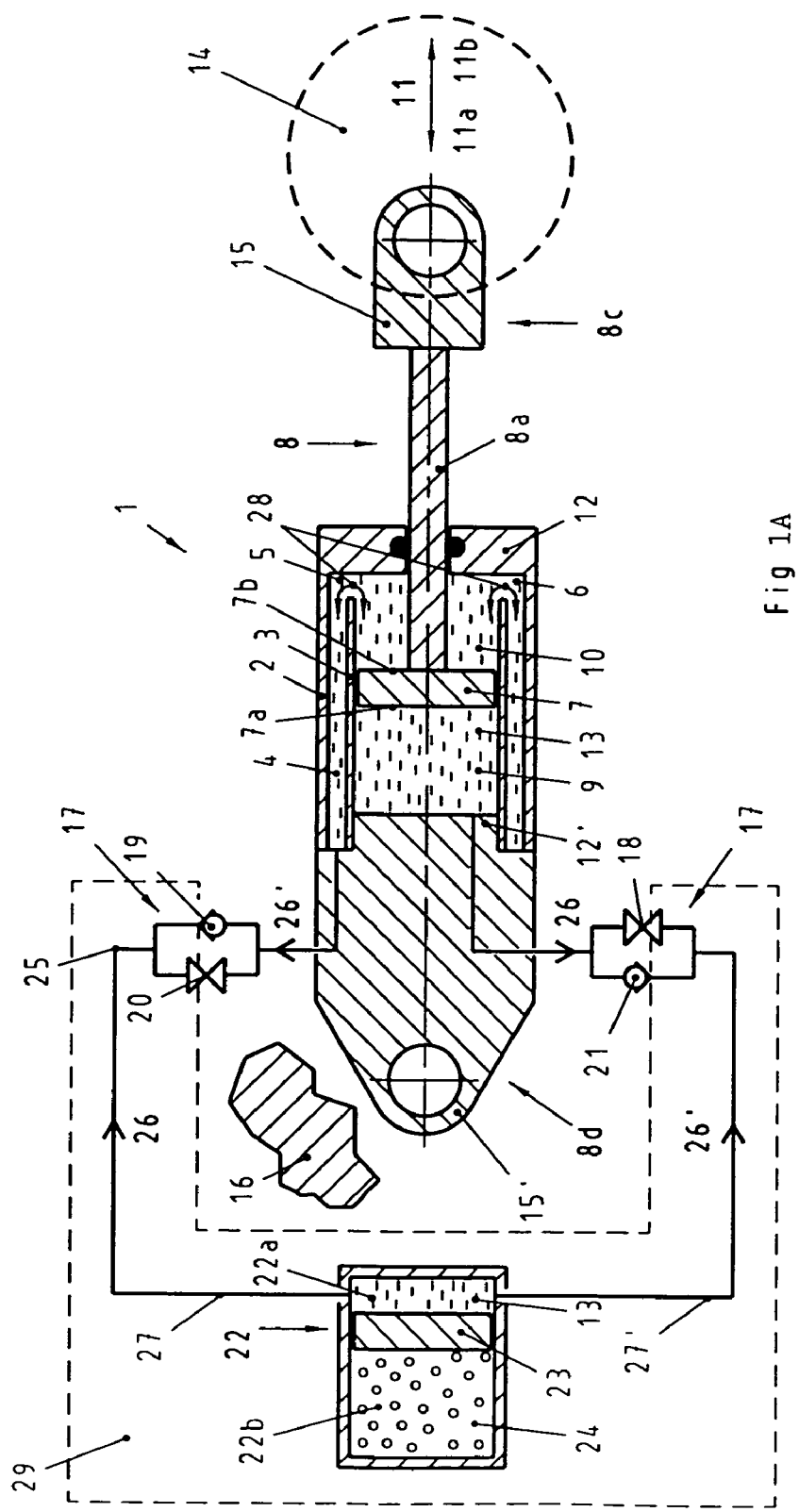

The indicator(-s) 33, 33' according to claims 14-16 may work in other applications for vehicles than described combined with members 2, 3, 7, 8, 22, only. The same is valid for the sealing arrangement including seals 35a, 36a, according to claims 23 and 29, which attains a low or small friction. This separate invention is combined with the same above mentioned members. The complete sealing arrangement includes the seals of the members 15" and 22, as well. The piston rod FIG. 1A is not through going the cylinder space 9, 10 and is sealed by only one seal, compare seal 36a in FIG. 1. The damper end 8d do not have space for journaling any rod or rod part as in FIG.1. Otherwise, the structure of FIG. 1A corresponds that of FIG. 1.

The invention claimed is:

1. A shock absorber aranged to damp relative movement between moving parts of vehicles, wherein ends of the shock absorber are connected to fixing devices attached to the moving parts and further comprise:
    a main piston; and
    a piston rod arrangement arranged in a hydraulic damping medium filled internal volume separated by the main piston in a compression volume and an expansion volume, and surrounded by an arrangement comprising two concentric inner and outer tubes separated by a space, wherein the damped movement between the moving parts is settled by a valve arrangement comprising:
    first adjustment devices connected to the compression volume; and
    a second adjustment connected to the expansion volume, wherein a first pressurized volume is created in a volume in a pressure maintaining accumulator by a pressure-generating piston separating the fluid damping medium from a compressible medium,
    wherein the first pressurized volume is arranged in a part forming a damper head attached to the inner and outer tubes, and
    wherein the second adjustment further comprises:
    a first damping force generating valve and first non-return valve placed in a pipe between the compression volume and the first pressurized volume; and
    a second damping force generating valve and first non-return valve placed in a pipe between the expansion volume and the first pressurized volume.

2. The shock absorber according to claim 1, wherein the first pressurized volume is arranged in the damper head is comprised in a pipe system for movement of the medium between the compression volume and the expansion volume through the pipe system so that no additional ducts need to be arranged to set up the pipe system.

3. The shock absorber according to claim 2, characterized in that the pipes/system and ducts of the medium between the compression volume and the expansion volume are located in the damper head at least one of ends and starts in the space between the inner and outer tube and in the compression volume.

4. The shock absorber according to any of the preceding claims, wherein the piston rod arrangement extends from both sides of the piston respectively and has a path of movement passing through the central part of the first volume arranged in the damper head.

5. The shock absorber according to claim 4, wherein the pressure-generating piston in the pressure-maintaining accumulator is sealed internally with seals against a component connected with the damper head and placed outside the path of movement of the piston rod arrangement.

6. The shock absorber according to claim 5, wherein the component placed outside the path of movement of the piston rod arrangement is one of the fixing devices.

7. he shock absorber according to claim 6, wherein the one of the fixing devices has the form of a top eye with a fixing part and a cylindrical part with an internal opening on the outside of which the seals are arranged.

8. The shock absorber according to claim 7, wherein the fixing device in the form of a top eye is separated from the piston rod arrangement.

9. The shock absorber according to claim 8, wherein a part of the piston rod arrangement is able to move inside the opening in the cylindrical part when the main piston moves.

* * * * *